(12) United States Patent
Veeraswamy et al.

(10) Patent No.: US 8,285,967 B1
(45) Date of Patent: Oct. 9, 2012

(54) METHOD FOR ON-DEMAND BLOCK MAP GENERATION FOR DIRECT MAPPED LUN

(75) Inventors: Sairam Veeraswamy, South Grafton, MA (US); Morgan A. Clark, South Orange, NJ (US)

(73) Assignee: EMC Corporation, Hopkinton, MA (US)

( * ) Notice: Subject to any disclaimer, the term of this patent is extended or adjusted under 35 U.S.C. 154(b) by 553 days.

(21) Appl. No.: 12/494,688

(22) Filed: Jun. 30, 2009

(51) Int. Cl.
*G06F 12/00* (2006.01)
*G06F 9/26* (2006.01)
*G06F 9/34* (2006.01)
*G06F 17/30* (2006.01)

(52) U.S. Cl. .......................... 711/202; 707/821; 707/822
(58) Field of Classification Search .................. None
See application file for complete search history.

(56) References Cited

U.S. PATENT DOCUMENTS

| | | | |
|---|---|---|---|
| 5,218,695 A * | 6/1993 | Noveck et al. ...................... 1/1 |
| 6,748,504 B2 * | 6/2004 | Sawdon et al. ............... 711/162 |
| 7,765,244 B2 * | 7/2010 | Rajakarunanayake ........ 707/823 |
| 7,941,709 B1 * | 5/2011 | Hong et al. ..................... 714/54 |
| 2006/0224843 A1 * | 10/2006 | Rao et al. ...................... 711/161 |
| 2007/0255921 A1 * | 11/2007 | Gole et al. .................... 711/170 |

* cited by examiner

*Primary Examiner* — Sanjiv Shah
*Assistant Examiner* — Craig Goldschmidt
(74) *Attorney, Agent, or Firm* — Krishnendu Gupta; William R. Clark; Deepika Bhayana

(57) ABSTRACT

This invention is a system and a method for operating a storage server in a data network using a new architecture. The method of creating the partial block map allows the snapshot writes on a direct mapped file. The method of reading data or writing data to the file created in direct mapping state and later converted to partial mapping state responsive to a copy on first write request by a client allocates new indirect block when needed to store the reference to newly allocated data block. The method of reading data from or writing data to the file in partial mapping state involves checking the mapping bit to find if the indirect block is in direct mapping state.

14 Claims, 11 Drawing Sheets

US 8,285,967 B1

METHOD FOR ON-DEMAND BLOCK MAP GENERATION FOR DIRECT MAPPED LUN

A portion of the disclosure of this patent document contains command formats and other computer language listings, all of which are subject to copyright protection. The copyright owner, EMC Corporation, has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates generally to accessing disk storage in a data storage environment, and more particularly to a system and a method for on-demand block map generation for a directly mapped Logical Unit (DLU).

BACKGROUND OF THE INVENTION

Network data storage is typically provided by an array of disk drives integrated with large semiconductor cache memory. A file server is used to interface the cached disk array to the network. The file server performs mapping of a network files to logical block addresses of storage in the cached disk array and move data between a network clients and the storage in the cached disk array. The file server use a network block services protocol in a configuration process in order to export to the network client logical volumes of the network-attached storage, which become local pseudo-disk instances. See, for example, Jiang et al., Patent Application Publication US 2004/0059822 A1 published Mar. 25, 2004, entitled "Network Block Services for Client Access of Network-Attached Storage in an IP Network," incorporated herein by reference. Network clients typically use a network file system access protocol to access one or more file systems maintained by the file server.

Typically the logical block addresses of storage are subdivided into logical volumes. Each logical volume is mapped to the physical storage using a respective striping and redundancy scheme. The data mover computers typically use the Network File System (NFS) protocol to receive file access commands from clients using the UNIX (Trademark) operating system or the LINUX (Trademark) operating system, and the data mover computers use the Common Internet File System (CIFS) protocol to receive file access commands from clients using the MicroSoft (MS) WINDOWS (Trademark) operating system. The NFS protocol is described in "NFS: Network File System Protocol Specification," Network Working Group, Request for Comments: 1094, Sun Microsystems, Inc., Santa Clara, Calif., March 1989, 27 pages, and in S. Shepler et al., "Network File System (NFS) Version 4 Protocol," Network Working Group, Request for Comments: 3530, The Internet Society, Reston, Va., April 2003, 262 pages. The CIFS protocol is described in Paul J. Leach and Dilip C. Naik, "A Common Internet File System (CIFS/1.0) Protocol," Network Working Group, Internet Engineering Task Force, The Internet Society, Reston, Va., Dec. 19, 1997, 121 pages.

The data mover computers may also be programmed to provide clients with network block services in accordance with the Internet Small Computer Systems Interface (iSCSI) protocol, also known as SCSI over IP. The iSCSI protocol is described in J. Satran et al., "Internet Small Computer Systems Interface (iSCSI)," Network Working Group, Request for Comments: 3720, The Internet Society, Reston, Va., April 2004, 240 pages. The data mover computers use a network block services protocol in a configuration process in order to export to the clients logical volumes of network attached storage, which become local pseudo-disk instances. See, for example, Jiang et al., Patent Application Publication US 2004/0059822 A1 published Mar. 25, 2004, entitled "Network Block Services for Client Access of Network-Attached Storage in an IP Network," incorporated herein by reference.

A storage object such as a virtual disk drive or a raw logical volume can be contained in a file compatible with the UNIX (Trademark) operating system so that the storage object can be exported using the NFS or CIFS protocol and shared among the clients. In this case, the storage object can be replicated and backed up using conventional file replication and backup facilities without disruption of client access to the storage object. See, for example, Liang et al., Patent Application Publication US 2005/0044162 A1 published Feb. 24, 2005, entitled "Multi-Protocol Sharable Virtual Storage Objects," incorporated herein by reference. The container file can be a sparse file. As data is written to a sparse file, the size of the file can grow up to a pre-specified maximum number of blocks, and the maximum block size can then be extended by moving the end-of-file (eof). See, for example, Bixby et al., Patent Application Publication US 2005/0065986 A1 published Mar. 24, 2005, entitled "Maintenance of a File Version Set Including Read-Only and Read-Write Snapshot Copies of a Production File," incorporated herein by reference, and Mullick et al., Patent Application Publication 2005/0066095 A1 published Mar. 24, 2005, entitled "Multi-Threaded Write Interface and Methods for Increasing the Single File Read and Write Throughput of a File Server," incorporated herein by reference.

When using the network block services protocol to access a SCSI LUN contained in a UNIX-based container file system, there is often a performance degradation in comparison to access of a network attached SCSI LUN that is not contained in a container file system. This performance degradation is caused by a mapping overhead incurred when management of the container file system does a lookup of the address of the data block associated with a specified offset in the SCSI LUN and this lookup requires the fetching of one or more indirect blocks in the disk block hierarchy of the file containing the SCSI LUN. This mapping overhead has been tolerated as a characteristic of a UNIX file system that permits each data block to be allocated from any convenient location on disk. This characteristic of a UNIX file system supports sparse files and possible sharing of specified data blocks between files for enabling "write somewhere else" snapshot copies, and de-duplication of specified data blocks. Nevertheless, it is desired to eliminate this mapping overhead for a file containing a network-attached SCSI LUN or any other file that sometimes might not need each data block to be allocated from any convenient location on disk.

The data block mapping protocol of a file is selectable between a direct mapping protocol that does not use mapping information stored in any indirect block of the file, and an indirect mapping protocol that uses mapping information stored in at least one indirect block of the file. Thus, at any given time, a file is either in a direct mapping state or an indirect mapping state. In the direct mapping state, once the inode for a file is fetched from storage, a pointer to a specified data block in the logical extent of the file is computed by execution of a computer program without accessing mapping information from any indirect block of the file. In the indirect mapping state, computation of a pointer to a specified block in the logical extent of the file may require information read from an indirect block of the file. Further, direct-mapped means all data blocks have a predetermined location, and that all data blocks are assumed to be allocated; direct-mapping does not allow for holes in the file structure until you get partial direct mapping, and then holes can only appear in indirect-mapped parts of the file.

In an indirect mapping protocol, such as the conventional indirect mapping protocol of a UNIX-based file system, the indirect mapping protocol permits any free block of the file system to be allocated to a file of the file system and mapped to any logical block of the logical extent of the file. This unrestricted mapping ability of the conventional indirect mapping protocol of a UNIX-based file system is a result of the fact that the metadata for each file includes a respective pointer to each data block of the file.

Thus, when the file is in the direct mapping state, data access performance is improved relative to data access performance of the indirect mapping state, because the direct mapping state ensures that once the inode of the file has been fetched from storage, there will be no need to fetch any indirect block table of the file from the storage in order to compute the physical location pointer to the data block for a specified logical block offset in the file.

When the file is in the indirect mapping state, flexibility of file system block allocation to the file is improved relative to the direct mapping state, because the use of at least one indirect block provides additional information for a more flexible allocation of file system blocks to the file. The additional flexibility of file system block allocation permits more efficient storage utilization by reducing storage fragmentation and permitting sparse files and efficient dynamic extension of files. In addition, the flexibility of allocating any free file system block to any logical block in the logical extent of a file permits supplementary storage services such as snapshot copy and de-duplication in which any data block in a file system can be freely shared among files of the file system.

A file in the direct mapped state does not have the flexibility of allocating any free file system block to any logical block in the logical extent of a file and thus does not permit supplementary storage services such as snapshot copy in which any data block in a file system can be freely allocated anywhere on the disk storage. To permit snapshot copy, it is necessary to either create the full map by accommodating data blocks that will be used for snapshot copy when creating a file in direct mapping mode or to convert the file in direct mapping mode to indirect mapping mode before creating snapshot copy.

Read or write access to files and their snapshot copies in a manner described above are considerably slower than access to files in direct mapping mode. As a result snap creation process also suffers from high preparation latency. Additionally writing data to file in fully direct mapping mode causes unnecessary space consumption because space required for all possible future snapshot copies of the file needs to be provisioned ahead of time when the file is initially created.

The storage technology described above, in combination with a continuing increase in disk drive storage density, file server processing power and network bandwidth at decreasing cost, has provided network clients with more than an adequate supply of network storage capacity at affordable prices. Increasing the performance by avoiding I/O involved in looking up block number, reducing the time it takes to read data from the file or write data to the file, reducing the space required to write data to file, to allow advanced operations like snapshot writes with partial direct mappings and to allow conversion from one mode to another would be advancement in the data storage computer-related arts. This is becoming increasingly important as the amount of information being handled and stored grows geometrically over short time periods and such environments add more file systems and data at a rapid pace.

SUMMARY OF THE INVENTION

To overcome the problems described above and to provide the advantages also described above, the present invention in one embodiment includes a method for operating a storage server in a data network for read or write access to data of a file, the file including multiple data blocks containing data of the file, and the file further including an inode containing metadata of the file. In response to a copy on first write request by a client of the storage server, direct mapped file is converted to the file in partial mapped state by allocating an indirect block pointer that stores mapping information that provides a binding of a file offset to a storage block address. All data blocks of the file in direct mapping state are accessed by a pre-defined mapping function that maps a block pointer to a file system data block. The file in partial mapped state includes at least one indirect block to obtain mapping information for reading data from or writing data to at least one of the data blocks of the file. At least one logical extent of the file is mapped to the multiple data blocks of the file without access to any indirect block of the file wherein the data block corresponding to a file offset is direct mapped and accessed by the pre-defined mapping operation.

In another embodiment method steps are carried out for unwinding a partial map of the file when the direct mapped file in the partially mapped state is converted back to the file in the direct mapping state. A logical extent of the file in direct mapping state is mapped to multiple data blocks of the file without access to any indirect block of the file.

In another embodiment, a program product includes a computer-readable medium having code included on the medium configured to carry out computer-executed steps that are similar or identical to those described above with reference to the embodiment of the method.

BRIEF DESCRIPTION OF THE DRAWINGS

The above and further advantages of the present invention may be better under stood by referring to the following description taken into conjunction with the accompanying drawings in which.

DETAILED DESCRIPTION OF THE PREFERRED EMBODIMENT

Figure 1:
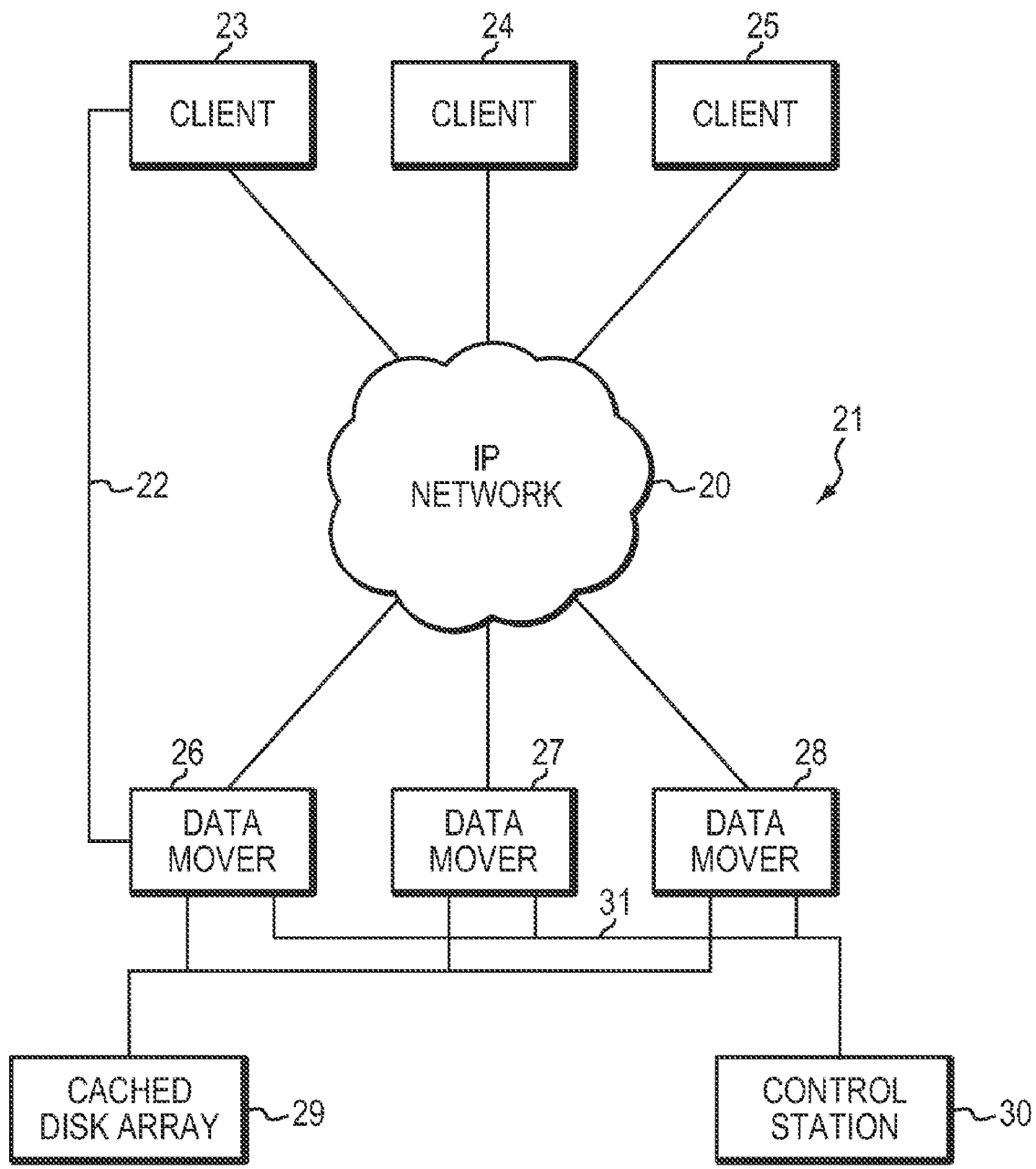
FIG. 1 is a block diagram of a network file server incorporating on-demand mapping creation facility in accordance with the present invention.

The methods and apparatus of the present invention are intended for use in a data storage environment that include data storage systems, such as the Symmetrix Integrated Cache Disk Array system or the Clariion Disk Array system available from EMC Corporation of Hopkinton, Mass. and those provided by vendors other than EMC, and a file server such as Celerra File Server, which is available from EMC Corporation of Hopkinton, Mass.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as a computer, the machine becomes an apparatus for practicing the invention. The methods and apparatus of the present invention may be implemented such that herein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits. The program code (software-based logic) for carrying out the method is embodied as part of the system described below.

Overview

The embodiment of the present invention increases the performance involved in block lookup, allows advanced operations like snapshot writes on a direct mapped file, allows the snapshot application to write to a file that is initially created in direct mapping mode, reduces the IO bandwidth usage and for large LUN or a file it eliminates the amount of storage required for metadata slices that stores the indirect blocks and other metadata. In response to a write request by a client to create or write to a snap shot copy of a file that is created in direct mapping mode, the file server creates a hierarchical mapping that stores the address of the data block in an indirect block, thus using indirect mapping for the block number on which write request is issued. Further, in response to restoring a data block to its direct-mapped location, the file server unwinds the indirect mapping by traversing the indirect block path from the inode to that data block and adjusting the mapping bits of the metadata of the file accordingly. Further file system recovery process is made aware of direct mapped file in partial mapping state and unwinds the indirect mapping as well during repair of a corrupted file system.

The major attributes of a direct mapped file are that for the working file, the initial and preferred state is that every data block can be located by applying a constant algorithm, not needing to consult indirect blocks, and all blocks in the working file are assumed to be allocated. A basic direct mapped file is laid out linearly on disk, with all data blocks located through an arithmetic mapping not requiring lookup through indirect blocks. In this form the file simulates a traditional dense or classic LU, and does not support thin provisioning or advanced features such as replicas. To support the advanced feature like snapshot copy, present invention introduces partial mapping where file in direct mapping mode can have block pointers that can either be directly mapped to data block or support hierarchical mapping where data block number is found by look-up of address stored in the indirect block.

The new architecture also allows for quick access to a file that has a partial mapping by checking the address range of the file to find if it is mapped or not and performing the lookup of the data block accordingly to satisfy the request by a client. By creating the partial block mapping on demand, the present invention further exploits the benefit of snapshot services. Advantages provided include: (1) creation of a snapshot copy and allowing writes to a direct mapped file (1) reduction of overall I/O requirements of a system; (2) low latency in accessing the file data; and (3) space efficiency and economical use of storage resources.

Architecture

FIG. 1 shows an Internet Protocol (IP) network 20 including a multi-protocol network file server 21 and multiple clients 23, 24, 25 that access the cached disk array 29 for reading or writing data stored on the disks. The network file server 21, for example, has multiple data mover computers 26, 27, 28 for moving data between the IP network 20 and a cached disk array 29. The network file server 21 also has a control station 30 connected via a dedicated dual-redundant data link 31 among the data movers for configuring the data movers and the cached disk array 29.

Further details regarding the network file server 21 are found in Vahalia et al., U.S. Pat. No. 5,893,140, incorporated herein by reference, and Xu et al., U.S. Pat. No. 6,324,581, issued Nov. 27, 2001, incorporated herein by reference. The network file server 21 is managed as a dedicated network appliance, integrated with popular network operating systems in a way, which, other than its superior performance, is transparent to the end user. The clustering of the data movers 26, 27, and 28 as a front end to the cached disk array 29 provides parallelism and scalability. Each of the data movers 26, 27, 28 is a high-end commodity computer, providing the highest performance appropriate for a data mover at the lowest cost. The data mover computers 26, 27, 28 may communicate with the other network devices using standard file access protocols such as the Network File System (NFS) or the Common Internet File System (CIFS) protocols, but the data mover computers do not necessarily employ standard operating systems. For example, the network file server 21 is programmed with a UNIX-based file system that has been adapted for rapid file access and streaming of data between the cached disk array 29 and the data network 20 by any one of the data mover computers 26, 27, 28.

Figure 2:
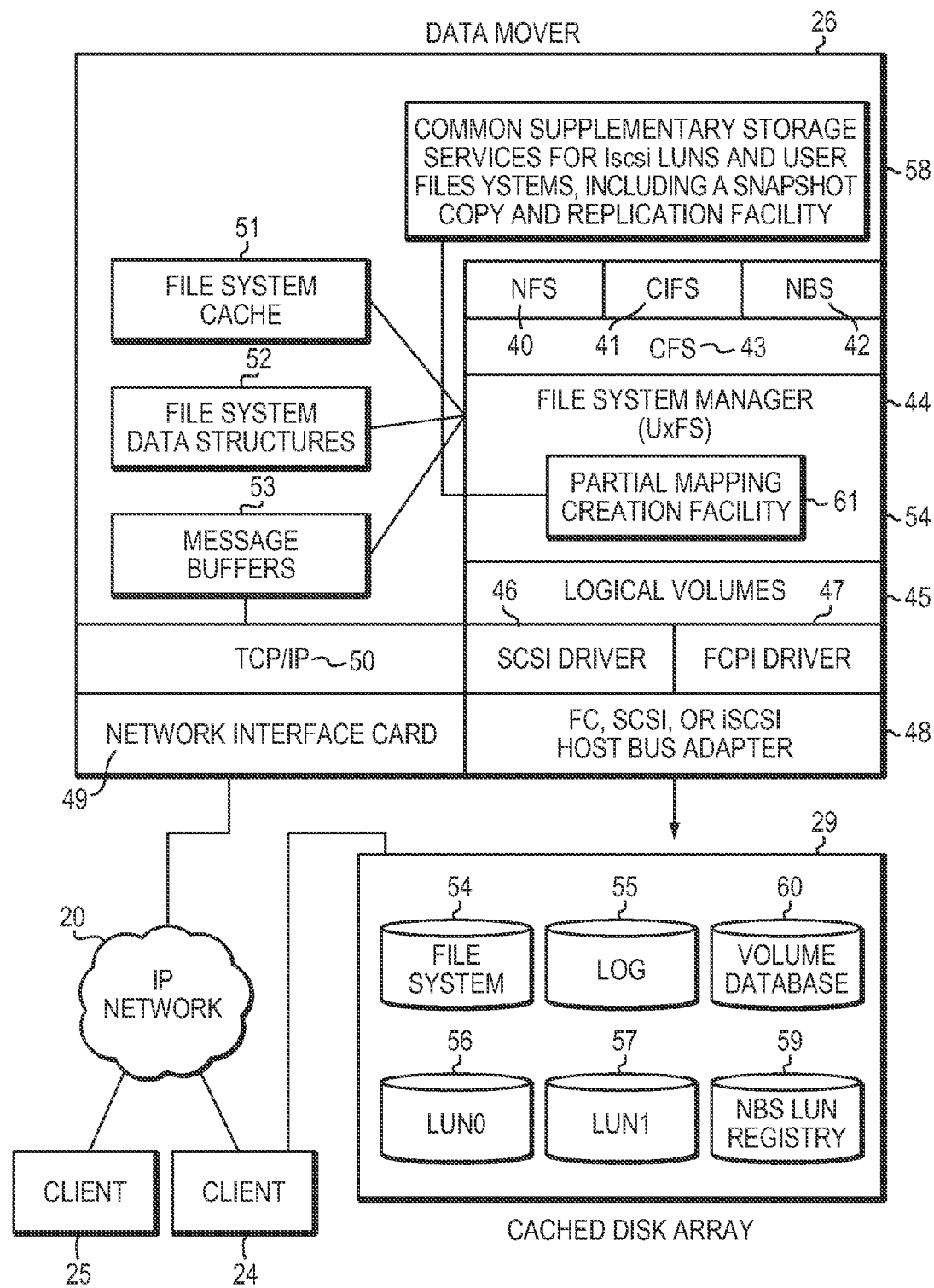
FIG. 2 is a block diagram showing details of a data mover and a cached disk array introduced in FIG. 1.

FIG. 2 shows software modules in the data mover 26 introduced in FIG. 1. The data mover has a Network File System (NFS) module 40 for supporting communication among the clients and data movers of FIG. 1 over the IP network 20 using the NFS file access protocol, and a Common Internet File System (CIFS) module 41 for supporting communication over the IP network using the CIFS file access protocol. The data mover 26 also has a network block services (NBS) module 42 for exporting to the clients logical volumes 56, 57 of network attached storage in the cached disk array 29. These logical volumes 56, 57 then become pseudo-disk instances that appear local to the clients. The clients may then use the Internet Small Computer Systems Interface (iSCSI) protocol with the data mover 26 to access these logical volumes as iSCSI logical unit number (LUNs), as further described in Jiang et al., Patent Application Publication US 2004/0059822 A1 published Mar. 25, 2004, incorporated herein by reference. The NBS module has a LUN registry 59 in storage to provide a mapping of a (target, LUN) specifier in a client request to the logical storage address of the LUN 56, 57 in the cached disk array.

The NFS module 40, the CIFS module 41, and the NBS module 42 are layered over a Common File System (CFS) module 43, and the CFS module is layered over a Universal File System (UxFS) module 44. The UxFS module 44 functions as a manger for managing UNIX-based file systems and uses the file system data structures 52. The CFS module 43 provides higher-level functions common to NFS, CIFS, and NBS. The UxFS module 44 is layered over a logical volumes module 45. The logical volumes module 45 provides a respective metavolume of storage of the cached disk array 29 for each UNIX-based file system. The metavolume are defined by configuration information stored in a volume database 60 in the cached disk array 29. The logical volumes module 45 is layered over a SCSI driver 46 and a Fibre-channel protocol (FCP) driver 47 in order to access logical storage in the cached disk array 29. The data mover 26 sends storage access requests through a host bus adapter 48 using the SCSI protocol, the iSCSI protocol, or the Fibre-Channel protocol, depending on the physical link between the data mover 26 and the cached disk array 29.

A network interface card 49 in the data mover 26 receives IP data packets from the IP network 20. A TCP/IP module 50 decodes data from the IP data packets for the TCP connection and stores the data in message buffers 53. For example, the UxFS layer 44 writes data from the message buffers 53 to a file system 54 in the cached disk array 29. The UxFS layer 44 also reads data from the file system 54 or a file system cache 51 and copies the data into the message buffers 53 for transmission to the network clients, 24, 25.

To maintain the file system 54 in a consistent state during concurrent writes to a file, the UxFS layer 44 maintains file system data structures 52 in random access memory of the data mover 26. To enable recovery of the file system 54 to a consistent state after a system crash, the UxFS layer 44 writes file metadata to a log 55 in the cached disk array during the commit of certain write operations to the file system 54.

The network file server also provides metadata services to the client 24, 25 so that the client may perform read and write operations directly to the cached disk array 29 over a data link 22. For example, as described in Vahalia et al. U.S. Pat. No. 6,973,455 issued Dec. 6, 2005, incorporated herein by reference, the client 23 sends to the file server 21 at least one request for access to a file. In response, the file server 21 grants a lock to the client 24, and returns to the client metadata of the file including information specifying data storage locations in the cached disk array 29 for storing data of the file. The client 24 receives the metadata, and uses the metadata to produce at least one data access command for accessing the data storage locations in the cached disk array 29. The client sends the data access command to the cached disk array 29 to read or write data to the file. For a write operation, the client 24 may modify the metadata. When the client 24 is finished writing to the file, the client returns any modified metadata to the network file server.

The network file server also provides common supplementary storage services 58 for iSCSI LUNs and user file systems, including a snapshot copy and replication facility, and other services for backup, recovery, and information lifecycle management (ILM. By containing the storage of each iSCSI LUN in the logical extent of a respective file, it is possible to use the same programs for backup, recovery, and ILM of files or iSCSI LUNs. Thus, the common supplementary storage services 58 may use the NFS module 40 for access to container file systems for iSCSI LUNs in a conventional fashion. The present invention relates to partial mapping creation 61 that is included in the file system module.

Figure 3:
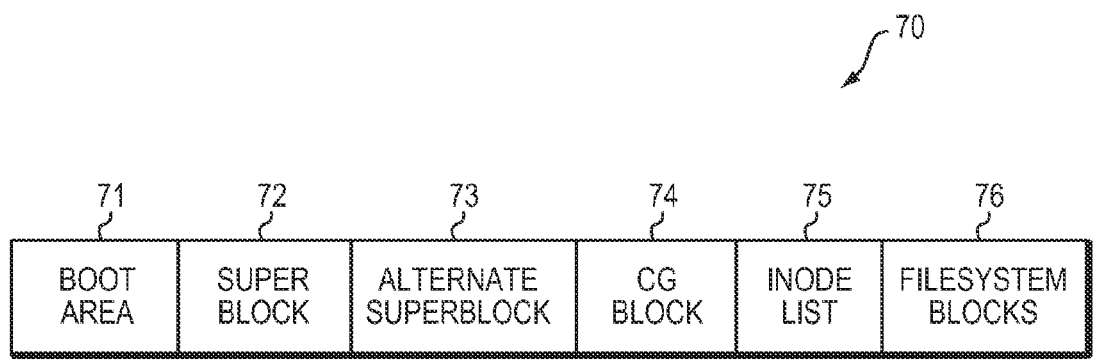
FIG. 3 is a block diagram of a UNIX-based file system in data storage.

The conventional organization and management of a UNIX-based file system is described in Uresh Vahalia, Unix Internals—The New Frontiers, Chapter 9, File System Implementations, pp. 261-290, Prentice-Hall, Inc., Upper Saddle River, N.J. (1996). As shown in FIG. 3, the on-disk layout of a file system 70 includes a boot area 71, a superblock 72, an alternate superblock 73, Cylinder Group Block (CG) block 74, an inode list 75, and file system blocks 76. The boot area 71 may contain code for booting an operating system. The superblock 72 and alternate super block 73 contains attributes and metadata of the file system itself. Cylinder Group Block 74 contains metadata information pertaining to cylinder groups. Inode list 75 includes the list of all inodes of every file that is present in the file system 70.

The inode list 75 is a linear array of inodes. There is one inode for each file in the file system. Each inode can be identified by its inode number, which equals its index in the inode list. Several inodes may fit into one of the file system blocks 76. The inode number can be easily translated into a block number and an offset of the inode from the start of the block. Each inode contains metadata of the file. (See Vahalia, page 263.) Some of the file system blocks 76 are data blocks, and other file system blocks may be indirect blocks, as described below with reference to FIG. 4, or free blocks that have not yet been allocated to any file in the file system.

Figure 4:
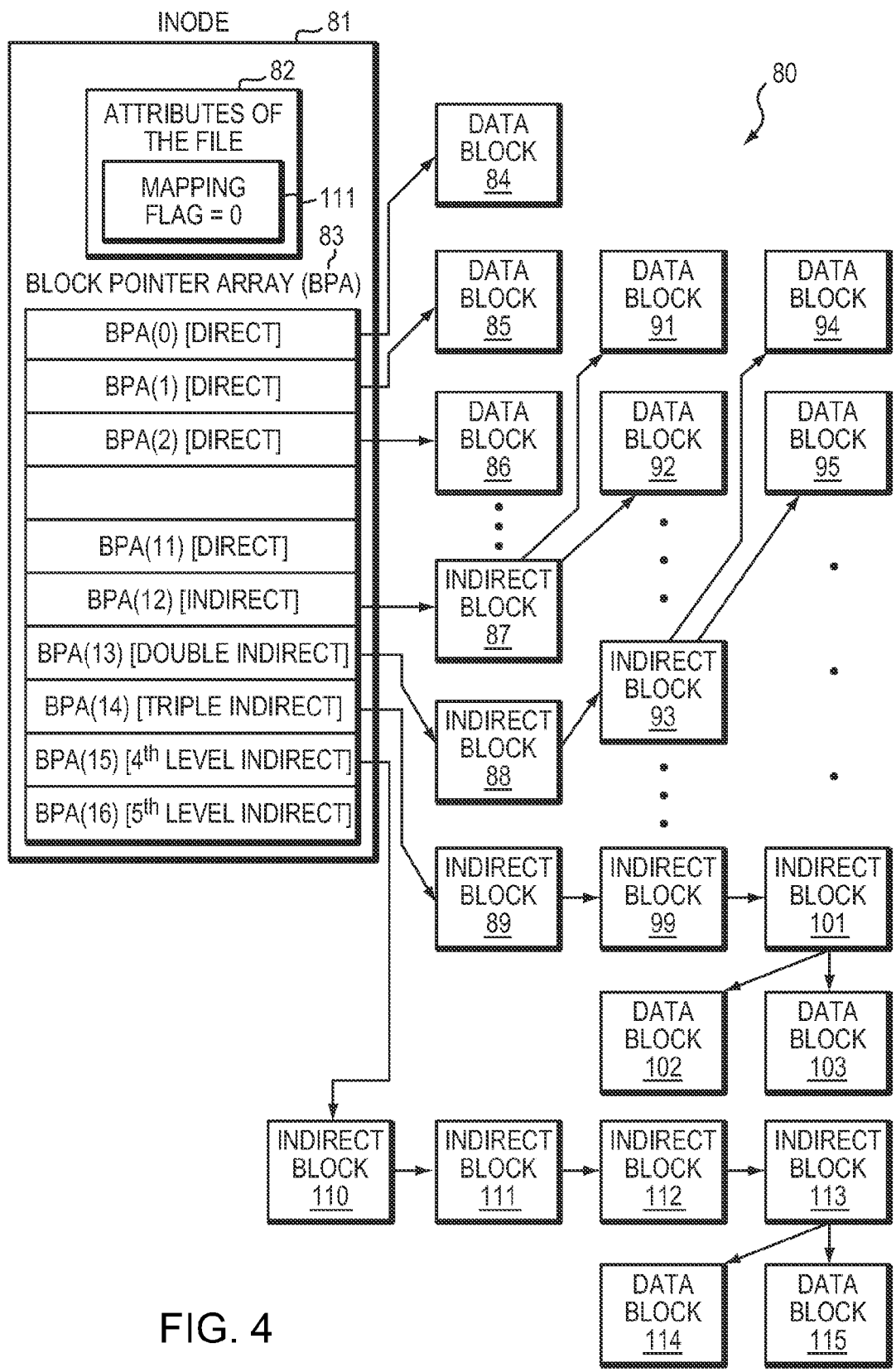
FIG. 4 is a block diagram of a file using the indirect mapping of the UNIX-based file system for mapping data blocks of the file to the logical extent of the file.

FIG. 4 shows a file 80 using the indirect mapping of the UNIX-based file system. It indicates the standard hierarchical file system. The file 80 includes an inode 81 containing attributes 82 of the file, and a block pointer array 83. The block pointer array 83 has seventeen block pointer array entries having respective values BPA(0) to BPA(14). The first of up to twelve entries BPA(0) to BPA(11) directly point to the first of up to twelve data blocks 84, 85, 86, etc. of the file 80. (See Vahalia, FIGS. 9-4, page 265.)

If the file 80 contains more than twelve data blocks, then the thirteenth entry of the block pointer array 83 contains an indirect block pointer BPA(12) pointing to an indirect block 87 containing pointers to one or more additional data blocks 91, 92, etc. If the file 80 contains so many data blocks that the indirect block 87 becomes full of block pointers, then the fourteenth entry of the block pointer array 83 contains a double indirect block pointer BPA(13) to an indirect block 88 that itself points to an indirect block 93 that points to one or more additional data blocks 94, 95, etc. If the file 80 is so large that the indirect block 88 becomes full of block pointers and its descendant indirect blocks are also full of block pointers, then the fifteenth entry of the block pointer array 83 contains a triple indirect block pointer BPA(14) to an indirect block 89 that points to an indirect block 99 that points to an indirect block 101 that points to one or more additional data blocks 102, 103, etc. Similarly there are fourth and fifth level of indirections indicated by indirect blocks 110-113 and data blocks 114-115. Once the indirect blocks at last level of indirection and its descendant indirect blocks become full of pointers, the file contains a maximum permitted number of data blocks. The attributes 82 of the file 80 include a mapping flag 111 set to zero to indicate that the file is in the indirect mapping state.

Figure 5:
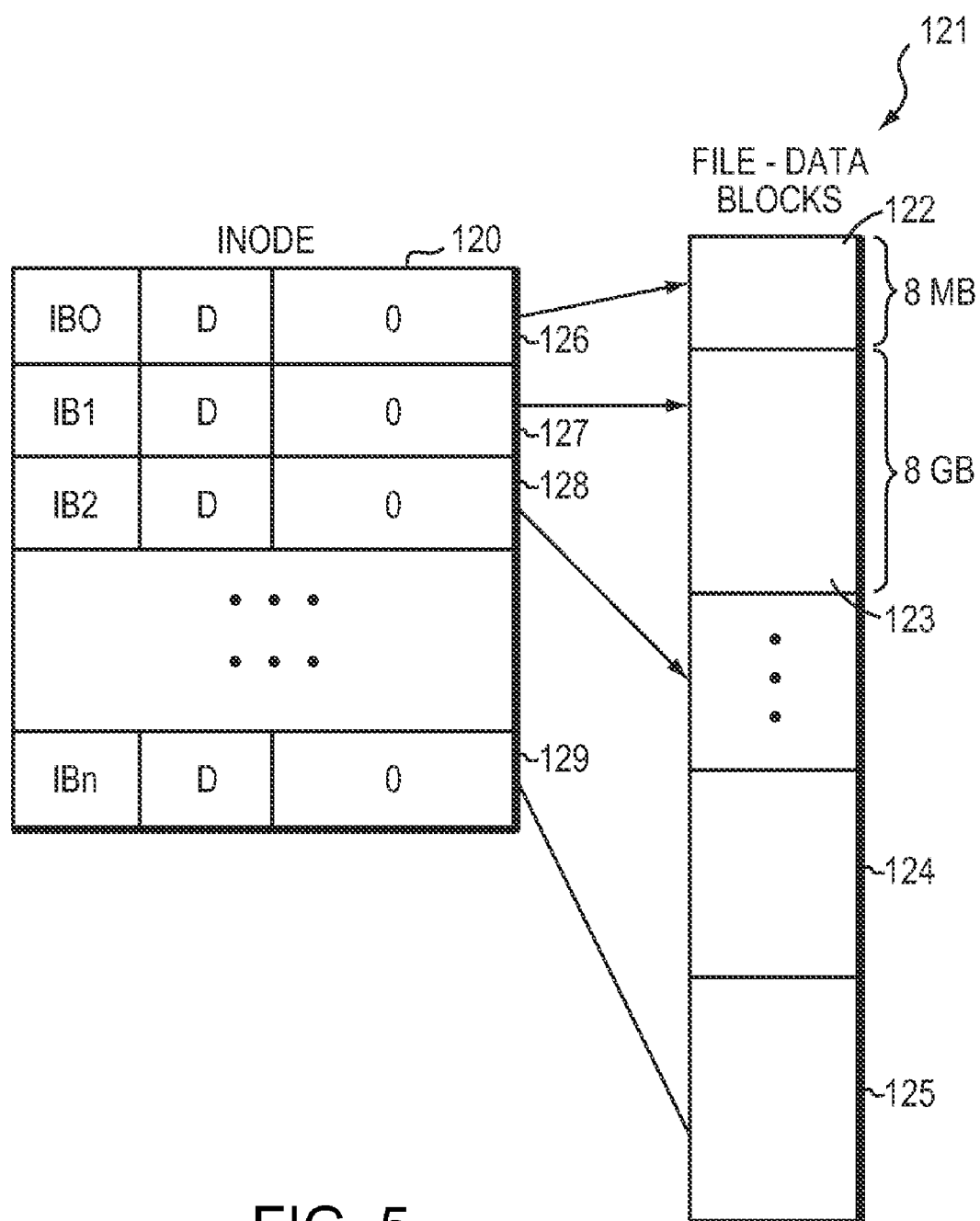
FIG. 5 is a block diagram of a file using a direct mapping policy for mapping data blocks of the file to the logical extent of the file.

FIG. 5 shows a file 121 in a direct mapping state. The inode 120 of the file 121 includes attributes of the file, and a block pointer array. The attributes include a mapping flag set to one to indicate that the file 121 is in the direct mapping state. The logical extent of the file is comprised consecutively of up to fifteen extents 122, 123, 124, 125 of contiguous file system data blocks. Each of the extents of contiguous file system data blocks is pointed to by a corresponding block pointer in the block pointer array. For example, the number of data blocks in each of the extents 122 to 125 is a predetermined function of the size of the file.

In a specific example, if a direct mapped file is to have data blocks allocated to all the logical blocks in its extent when the file is created, then each of the extents 122 to 125 has the same number of data blocks where each extent is represented by direct block and each direct block corresponds to exactly one FS block. For indirect blocks, each extent is multiple of the size of the previous extent due to increasing the indirection depth by one. Alternatively, only the first extent 122 is allocated to the file when the file is created, and the additional extents 123 to 125 are allocated on an as-needed basis if and when data is written to the file.

In general, it is practical for each file to have a different direct allocation policy, because for a direct mapped file, any kind of parameters or program code defining the direct allocation policy for the file can be stored in the memory or storage of the inode that is otherwise used for storing the block pointer array when the file is in the indirect mapping state. In addition, a particular one of multiple predefined mapping policy routines could be selected based on file attributes (such as file size, read-write, read-only, temporary, or retention protected), or based on the file type as specified by a file name extension.

Present invention introduces a new direct mapping bit "D" within the file structures (inodes, indirect blocks, block pointers, etc). The "D" bit in a data block pointer can be set only if the data block address is the calculated address from applying the direct-mapping function. And the "D" bit in an indirect block pointer can be set only if the "D" bits are set in all block pointers in that indirect block. A "D" at any level implies that all data blocks reachable from that level are allocated. When the "D" bit is set, block lookup stops when it sees the bit, applies the mapping function for the file offset, and continues as though it had finished a normal indirect block mapping. More generally, when a "D" bit is set in any block pointer, the indirect block sub tree below that block pointer, and the corresponding data slices, do not need to exist. The initial state for file in direct mapping mode is "D" bits set in the inode block array with no indirect blocks in existence.

Figure 6:
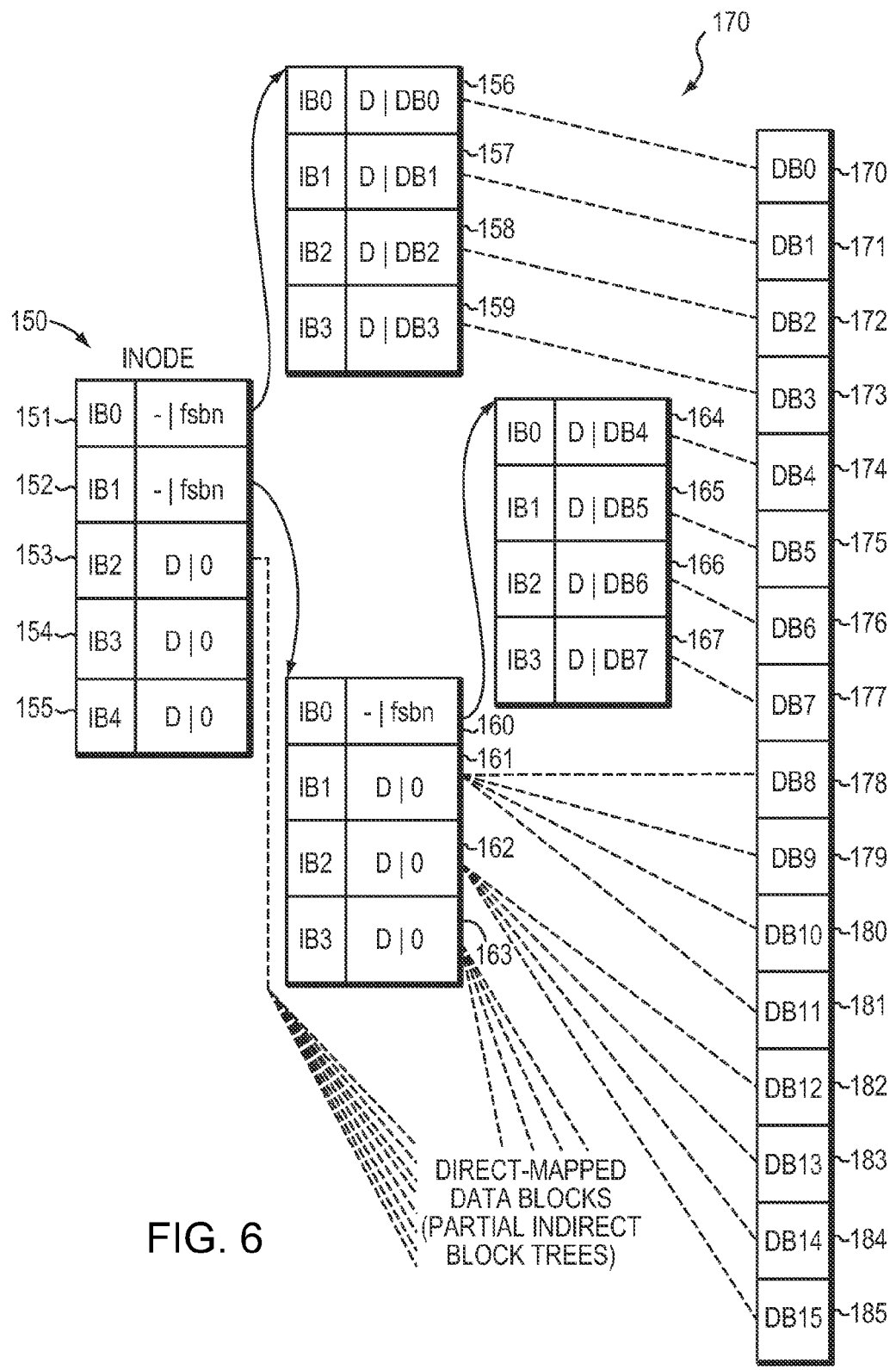
FIG. 6 is a block diagram of a file using a partial mapping for mapping data blocks of the file to the logical extent of the file.

FIG. 6 shows direct mapped file (DLU) in a partial mapped state where some of the blocks are directly mapped and some of them are mapped using standard indirect block lookup. In this example, some indirect block exists and some not. For example in FIG. 6, inode of a file 150 contains 5 indirect block pointers 151-155. Indirect Block 151 is not direct mapped and contains FS block number which needs to be looked up and during lookup; it's found that it points to another indirect block 156. The indirect block 156 have direct mapping flag set and data block 171 in file 170 can be accessed by applying pre-defined arithmetic mapping function. Similarly indirect block 152 is not direct mapped and stores FS block number that points to another indirect block 160 which further points to another indirect block 164 that is direct mapped and data block 174 can be computed using arithmetic mapping function. Indirect Block 157-159 all are direct mapped and points to set of data blocks 171-173. Similarly Indirect Block 165-167 are all direct mapped and set of data blocks 174-177 can be computed and doesn't need to be looked up. However, indirect blocks 161-163 are all direct mapped and data blocks 178-185 referenced by those indirect blocks are accessible by applying arithmetic formula. Similarly, indirect blocks 153-155 are all direct mapped and data blocks referenced by those indirect blocks are accessible by applying arithmetic formula. In all cases a translation from file offset to file system block number follows the same algorithm: a standard indirect block lookup, but at any point in the scan if a block is found with the direct ("D") flag set, the lookup stops at that point and the FS block number is calculated from the file offset The Direct (D) flag, when set in a mapping pointer, indicates that storage addresses for all data blocks accessible via the pointer are arithmetically computable (i.e., in the direct mapped address space of a direct mapped LUN/file (DLU)). Operations that allocate any blocks outside of their direct mapped addresses must clear the Direct (D) flag on the entire indirect block chain to the pointer. Operations that defragment the DLU address space (either by moving data blocks back into their direct mapped addresses, or by opportunistically reusing the direct mapped blocks at their computable offset during a write) are allowed to set the Direct (D) flag on pointers where the entire range of data blocks accessible via the pointer have been restored to direct mapping.

Figure 7:
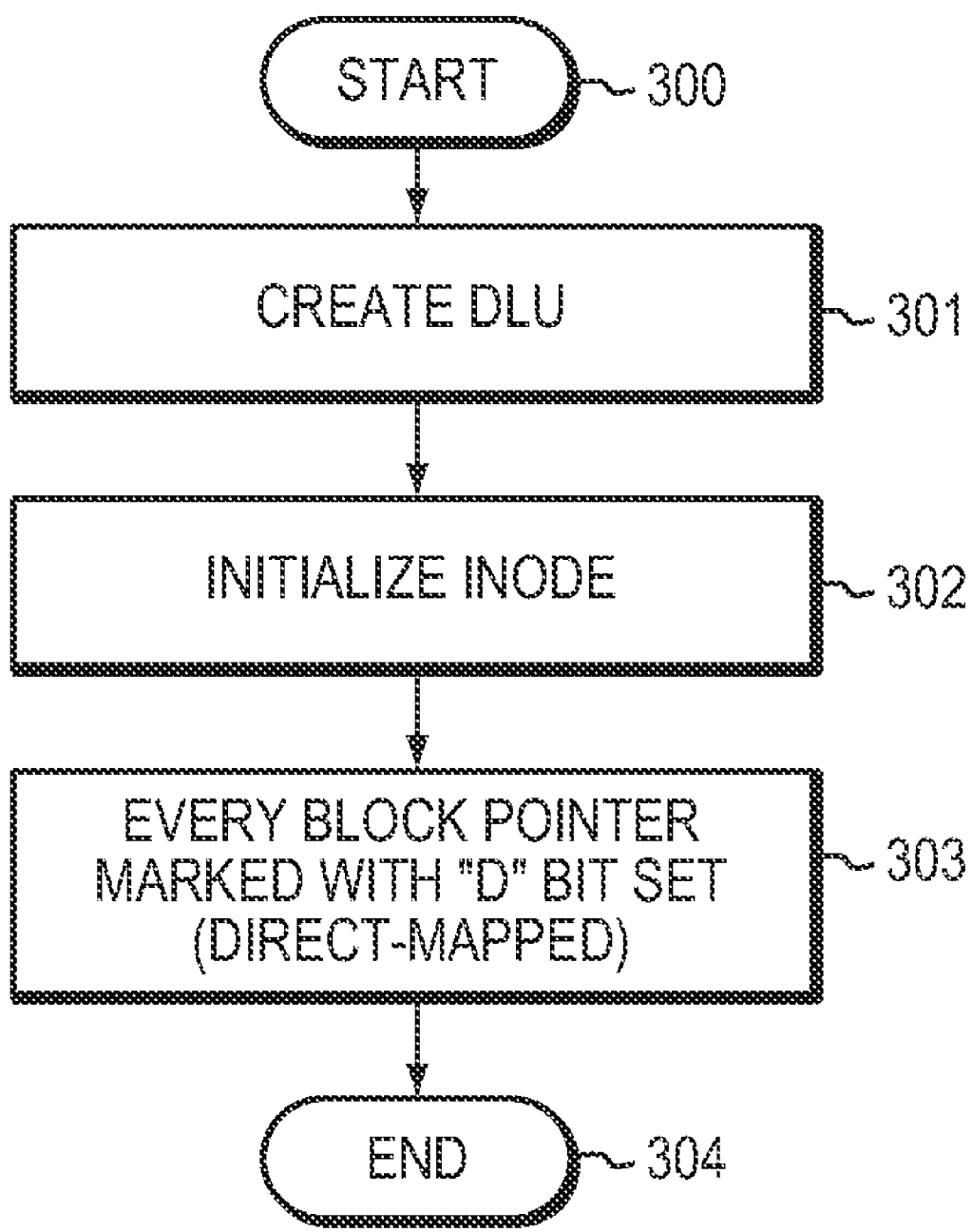
FIG. 7 is a flowchart of a subroutine of the on-demand mapping creation facility for creating a new file in fully direct mapping mode using the direct mapping introduced in FIG. 5.

FIG. 7 shows a subroutine of the partial creation mapping facility for creating a direct mapping file and its initialization. In step 300 the subroutine starts when the client issues a request in step 301 to create a file in direct mapping mode. At step 302, inode of the file is initialized where metadata for the file is initialized. In step 303, the direct mapping bit "D" present in the entire block pointer list is set to direct mapped. That means that these block pointer do not store the logical block address but all the data blocks are accessed by arithmetic operation and all of which are assumed to be implicitly allocated. The file is created and subroutine ends at step 304. This file will be directly mapped. It will have the specified size, and every block pointer will be marked "D" (direct-mapped). In this mode the file is completely direct-mapped ("D" flag set in every block pointer) and the indirect block tree is not complete. Initially the file system and file are created without any indirect blocks, but over time entire indirect block tree is completely built. The direct mapped file remains directly addressed. All indirect blocks are present but the "D" flag is set in every block pointer at every level, so any address lookup needs only examine the mode, find the "D" flag, and compute the FS block address. As a an optimization, once the snaps on the LU are deleted and the block map table is no longer required, a lower level indirect block can be folded and freed back after setting the D bit of the LBA entry of the patent indirect block pointing to it.

Further Operation Details

Reference will be made below to FIGS. 8-11 to describe a problem solved with the architecture described above with reference to FIGS. 1-7; however, a general overview is now given. The inventors have critically recognized that file in direct mapping state does not support snapshot services because for the snap copy, all the space needs to be reserved upfront and all logical extents of the file needs to be mapped by pre-defined algorithm formula. There is no flexibility of reserving a block anywhere and writing to it. Further, a file in indirect mapping state suffers from expensive lookup operation that is involved when logical block address is mapped to actual data block.

This problem is addressed with the architecture of the present invention by creating the partial block map only when required. The file stays in direct mapping mode unless applications like snap needs to write a block anywhere on the storage space and then at that moment only mapping for only the block being copied or written is created. The present invention thus allows snapshot writes, decreases the storage cost, I/O requirement and at the same time improves the efficiency and latency of the file server in a data network environment.

Figure 8:
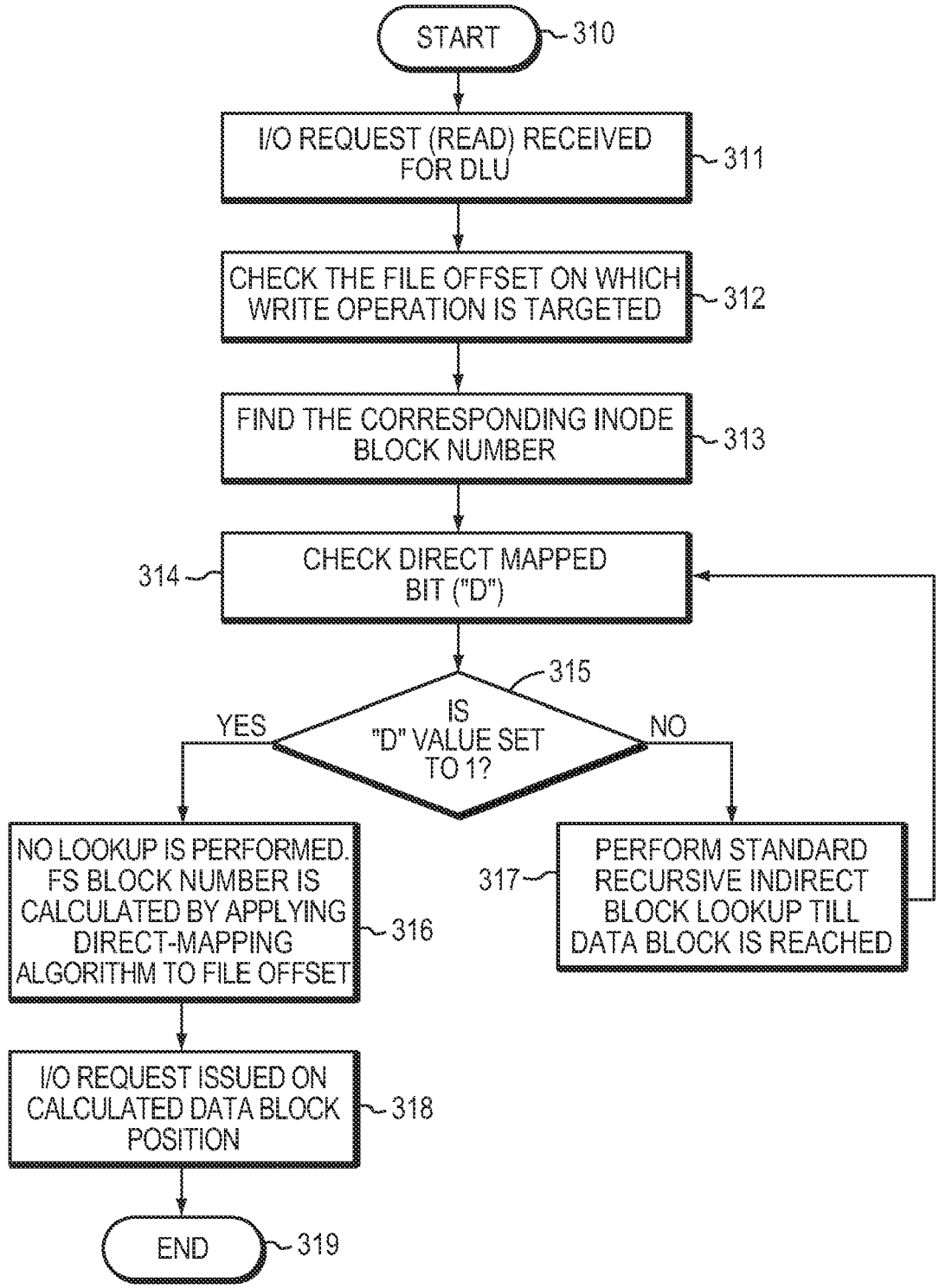
FIG. 8 is a flowchart of a subroutine of the on-demand mapping creation facility for finding the logical block address of a block at a specified file offset for a file that is in a partially direct mapping mode introduced in FIG. 6.

FIG. 8 shows a subroutine for performing read request on a file that is created in direct mapping mode but over time indirect blocks are created and is being used for mappings. Process starts at step 310. Client issues an I/O request to read data from a file created in direct mapping mode at step 311. At step 312, file offset is computed at which read request is targeted. Based on the file offset, corresponding inode block number is calculated at step 313 and the calculation depends upon the block size which is generally 8K in size. Next at step 314, direct mapping bit "D" is checked. This check is done to determine if the block lookup needs to be performed or data block address can be computed from arithmetic computation. This mapping bit distinguishes a block address that is direct mapped from block address that needs to be looked up, possibly through multiple levels of indirect block chain. This bit further supports the partial creation mapping where some parts of the file can be direct mapped and some parts can be accessed in indirect mapping mode. At step 315, mapping bit "D" flag value is checked against a pre-defined value, in this case with number 1. If the value is set to 1, at step 316, no block address lookup is performed. Data block is calculated by applying direct-mapping algorithm to file offset. At step 318, I/O request is issued against computed data block and data is read from that location. If the "D" value in mapping flag is set to "0", then at step 317 standard indirect block lookup is performed. Block number stored at that indirect block is read and its content is read. Mapping bit "D" or this block is again checked and if the value is set to "0", the lookup is again performed and block address stored at this block are read. This iterative process goes on till leaf indirect block is found with "D" bit set to 1. Without "D" being set, there can be no "D" mappings anywhere in the path. At that point data block is computed by using direct mapped algorithm and at step 319, actual data block is retrieved and I/O is issued against that data block. The read process ends at step 318 when the data is returned back to the client requesting the read operation.

Figure 9:
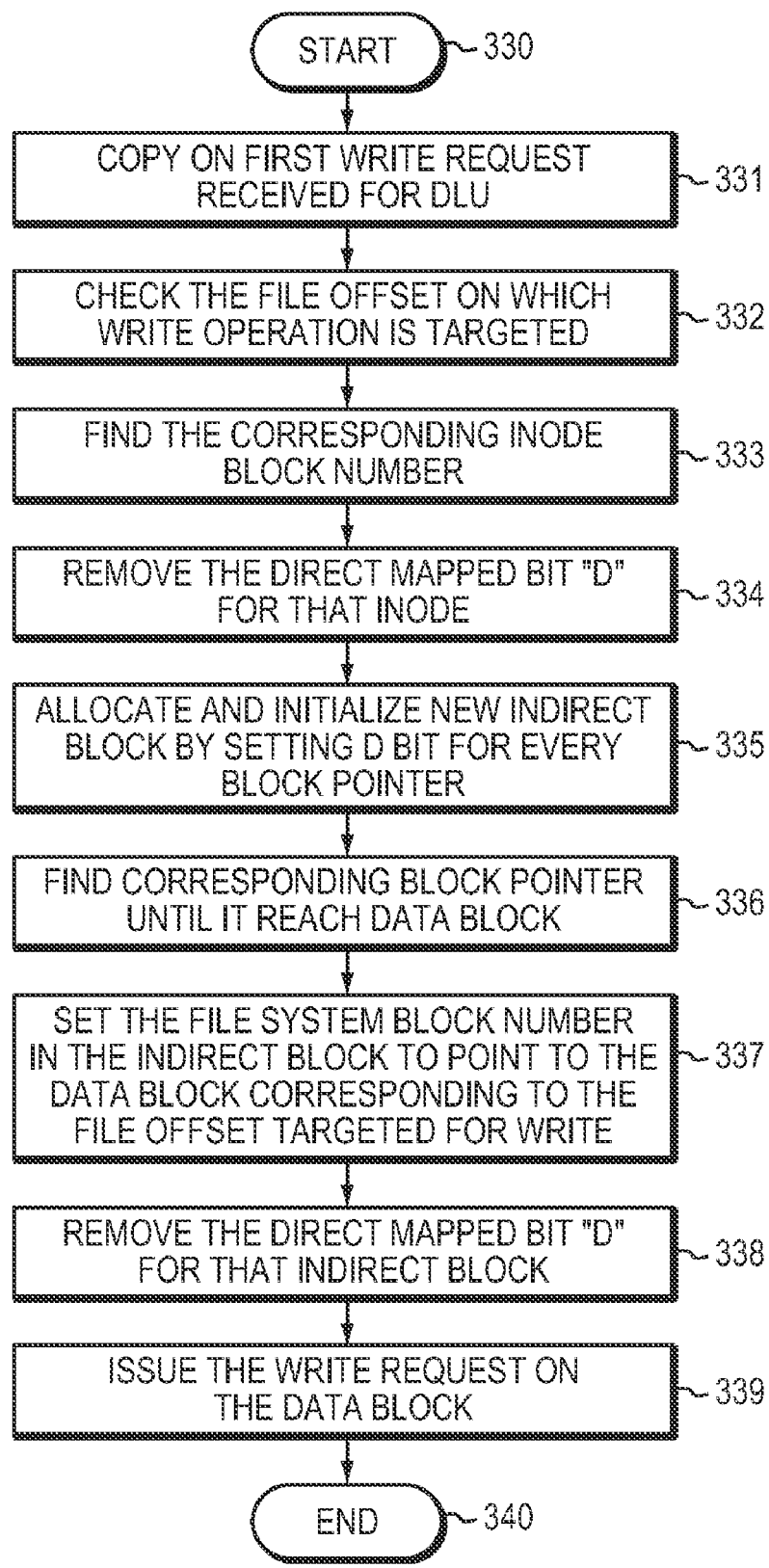
FIG. 9 is a flowchart of a subroutine for creating on-demand partial mapping when copy on first write is issued on a snap of a file in direct mapping mode introduced in FIG. 5.

FIG. 9 shows a subroutine for performing write request on a file that is created in direct mapping mode but creates partial mapping on-demand. Process starts at step 330. Client issues an I/O request to write data to a file created in direct mapping mode at step 331. At step 332, file offset is computed at which write request is targeted. Based on the file offset, corresponding inode block number is calculated at step 333 and the calculation depends upon the block size which is generally 8K in size. Next at step 334, direct mapping bit "D" is removed. This indicates that this particular inode is no longer in fully direct mapping mode. At step 335, new indirect block is allocated and initialized which indicates that block pointers stored in this indirect block will not be direct mapped. At step 336, find corresponding block pointer iteratively until it reaches data block. At step 337, address of the data block on which write operation is targeted is stored in the block pointer of the indirect block. Mapping bit "D" flag attribute of that indirect block is set to "0" at step 338. Next the write operation is issued on that data block at step 339 and I/O operation ends at step 340. The process of setting the block address in indirect block is a recursive process where if all the first level indirect block are pointing to next level indirect block, address of data block is set at leaf indirect block level and mapping bit "D" s cleared for every indirect block in that chain to indicate that standard address lookup needs to happen to access the data block stored at leaf indirect block level.

Figure 10:
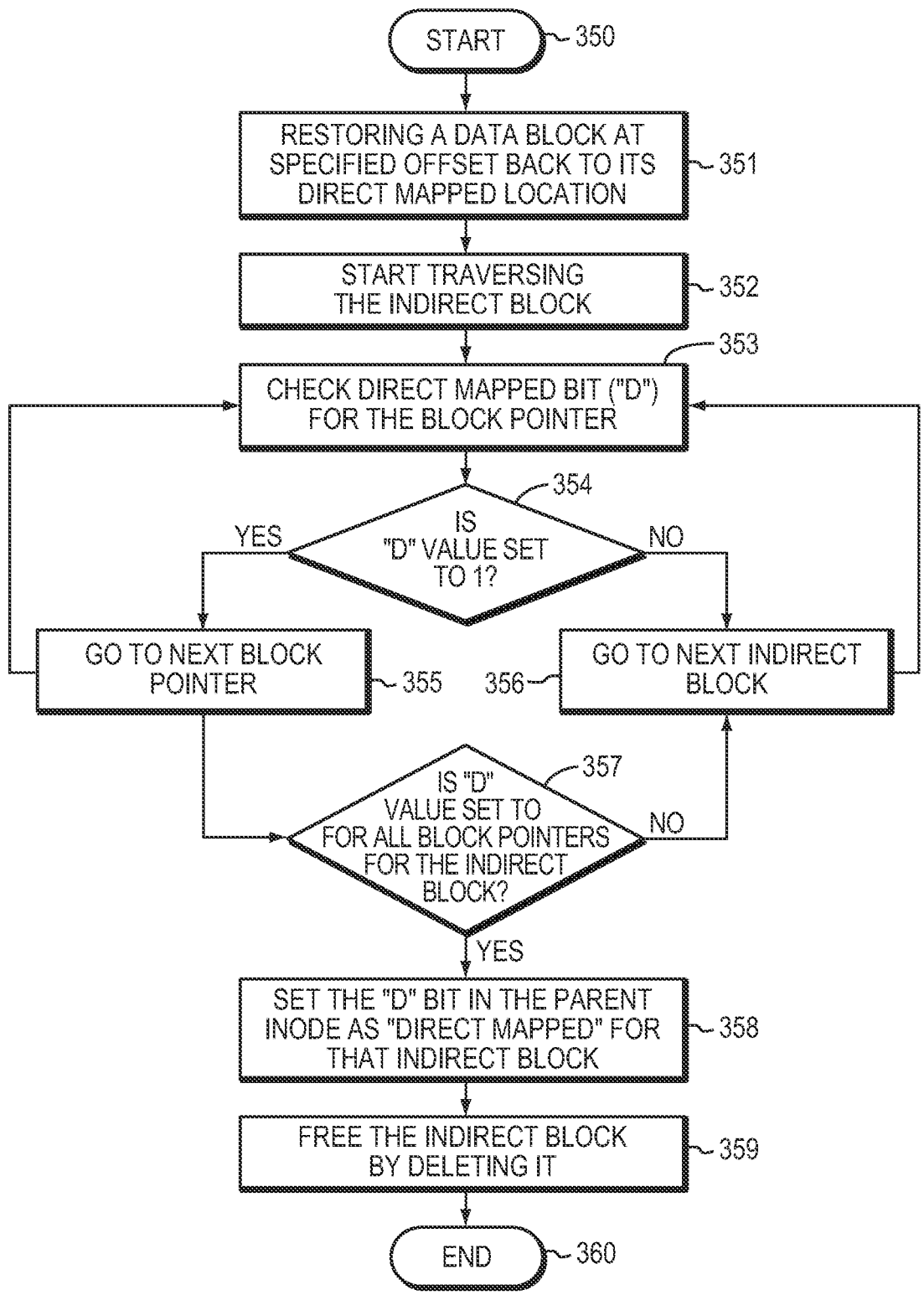
FIG. 10 is a flowchart of a subroutine for unwinding the partial mapping when a data block belonging to snapshot copy of a file in partial mapping mode is deleted or deallocated.

FIG. 10 shows a block diagram for a unwinding of a partial map when the file is converted back to direct mapping mode. The unwinding process starts at step 350. At step 351 converting to direct mapping mode request is received, which triggers the unwinding process. At step 352, process starts traversing the indirect block of the given file. Mapping flag "D" bit is checked at step 353 for the first block pointer of that indirect. If the mapping bit "D" value is set to 1 at step 354, it indicates that the block pointer is direct mapped and process iterates to next block pointer at step 355. If the mapping bit "D" is not set to 1, it indicates that the block pointer is not direct mapped and process moves onto next indirect block in the inode at step 356. All the block pointers in a given indirect block are checked. If any one of the block pointer in an indirect block has a direct mapping bit set to "0", that indirect block can not be freed and converted back to fully direct mapped. If mapping bit "D" flag is set to 1 for all block pointers in the indirect block at step 357, then that indirect block can be deallocated. The parent indirect block that includes the pointer to this indirect block is traversed back. It can be either an indirect block one level up or inode itself if the given indirect block was first level indirect block. The mapping bit "D" of parent inode or indirect block is set to 1 at step 358 indicating that this indirect block now is fully direct mapped. At step 359, the indirect block can now be deallocated and thus freed. The process iterates for all the indirect blocks in the inode and for all the indirect block chain for multiple indirection indirect blocks. When the complete indirect block tree is traversed, process stops at step 360.

Figure 11:
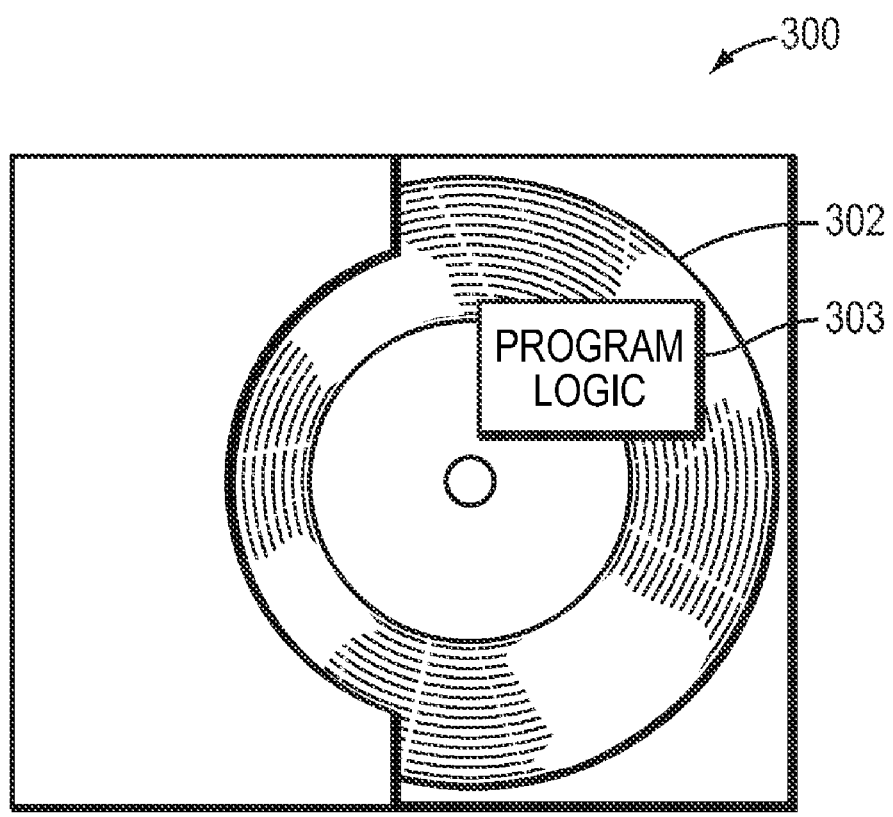
FIG. 11 shows a storage application for carrying out the methodology described herein and a computer medium including software described herein.

FIG. 11 shows the storage application 300 and Computer-readable medium 302 that includes program logic 303. Such a medium may be represented by any or all of those described at the beginning of this Detailed Description.

What is claimed is:

1. A method of operating a storage server in a data network for read or write access to data of a file, the file including a set of data blocks containing data of the file, and the file further including an inode containing metadata of the file, the method comprising the steps of:

creating the file in a direct mapped mode, wherein the direct mapped mode indicates that an address of each data block of the set of data blocks of the file is arithmetically computed by using a pre-defined function, wherein each data block of the set of data blocks is allocated on the storage server at the time the file is created;

responsive to a write request directed to the file in the direct mapped mode by a client of the storage server to write to a new data block, converting the file from the direct mapped mode to a partial mapped mode by allocating a new indirect block, wherein the new indirect block includes a set of data block pointers, wherein an address of the new data block is stored in a data block pointer of the set of data block pointers of the new indirect block; and performing an I/O request on the file in the partial mapped mode, wherein the I/O request includes reading to the file and writing to the file, wherein the partial mapped mode indicates that a first portion of the file is in an indirect mapped mode and a second portion of the file is in the direct mapped mode, wherein data of the first portion of the file in the indirect mapped mode is accessed by performing an address lookup operation;

wherein the inode of the file includes an inode mapping flag, wherein the inode mapping flag indicates whether the file is in the direct mapped mode, wherein the inode mapping flag of the file in the direct mapped mode indicates that an address of each data block of the set of data blocks of the file is arithmetically computed by using the pre-defined function;

wherein the inode of the file includes a set of indirect block pointers, wherein each indirect block pointer of the set of indirect block pointers includes an indirect block mapping flag and a set of data block pointers, wherein the indirect block mapping flag of each indirect block pointer of the set of indirect block pointers indicates whether the indirect block pointer is in a direct mapped state, wherein the direct mapped state indicates that each data block pointer of the set of data block pointers of the indirect block pointer is arithmetically computed by using the pre-defined function.

2. The method of claim 1, wherein the storage server is represented by a file server, wherein the file server presents a logical view of a file to a client of the file server.

3. The method of claim 1, wherein each data block pointer of a set of data block pointers stored in an indirect block pointer includes a data block mapping flag indicating whether the data block pointer is in the direct mapped state, wherein the direct mapped state indicates that a data block pointed to by the data block pointer is accessed by arithmetically computing an address of the data block by using the pre-defined function.

4. The method of claim 3, wherein creating the file in the direct mapped mode further comprising:
   updating the inode mapping flag of the inode of the file indicating that the file is in the direct mapped mode;
   updating the indirect block mapping flag of each indirect block pointer of the set of indirect block pointers of the inode indicating that each indirect block pointer is in the direct mapped state; and
   updating the data block mapping flag of each data block pointer of a set of data block pointers stored in each indirect block pointer of the set of indirect block pointers of the inode indicating that each data block pointer is in the direct mapped state.

5. The method of claim 3, wherein performing the I/O request on the file in the partial mapped mode further comprises the steps of:
   determining a data block pointer of the file, wherein the data block pointer is associated with a file offset, wherein the I/O request specifies the file offset for performing an I/O operation at the file offset;
   evaluating a data block mapping flag of the data block pointer; and
   based on the evaluation of the data block mapping flag, determining a file system block number for accessing data stored at the file offset, wherein the file system block number is arithmetically computed by using the pre-defined function if the data block mapping flag indicates that the data block pointer is in the direct mapped state.

6. The method of claim 3, wherein converting the file from the direct mapped mode to the partial mapped mode further comprises the steps of:
   updating the inode mapping flag of the inode of the file to indicate that the file is in the partial mapped mode;
   updating a data block mapping flag of each data block pointer of the set of data block pointers of the new indirect block to indicate that each data block pointer is in the direct mapped state;
   updating a data block mapping flag of a data block pointer of the new indirect block pointing to the new data block to indicate that the data block pointer is in an indirect mapping state; and
   updating an indirect block mapping flag of the new indirect block to indicate that the new indirect block is in a partial mapped state.

7. A method of operating a storage server in a data network for read or write access to data of a file, the file including a set of data blocks containing data of the file, and the file further including an inode containing metadata of the file, the method comprising the steps of:
   creating the file in a direct mapped mode, wherein the direct mapped mode indicates that an address of each data block of the set of data blocks of the file is arithmetically computed by using a pre-defined function, wherein each data block of the set of data blocks is allocated on the storage server at the time the file is created;
   responsive to a write request directed to the file in the direct mapped mode by a client of the storage server to write to a new data block, converting the file from the direct mapped mode to a partial mapped mode by allocating a new indirect block, wherein the new indirect block includes a set of data block pointers, wherein an address of the new data block is stored in a data block pointer of the set of data block pointers of the new indirect block; and
   performing an I/O request on the file in the partial mapped mode, wherein the I/O request includes reading to the file and writing to the file, wherein the partial mapped mode indicates that a first portion of the file is in an indirect mapped mode and a second portion of the file is in the direct mapped mode, wherein data of the first portion of the file in the indirect mapped mode is accessed by performing an address lookup operation; and
   converting the file from the partial mapped mode to the direct mapped mode by performing an unwinding operation, wherein the unwinding operation includes processing each indirect pointer of a set of indirect block pointers stored in the inode of the file and converting each indirect block pointer of the set of indirect block pointers from a partial mapped state to a direct mapped state;
   wherein the inode of the file includes an inode mapping flag, wherein the inode mapping flag indicates whether the file is in the direct mapped mode, wherein the inode mapping flag of the file in the direct mapped mode indicates that an address of each data block of the set of data blocks of the file is arithmetically computed by using the pre-defined function;
   wherein the inode of the file includes a set of indirect block pointers, wherein each indirect block pointer of the set of indirect block pointers includes an indirect block mapping flag and a set of data block pointers, wherein the indirect block mapping flag of each indirect block pointer of the set of indirect block pointers indicates whether the indirect block pointer is in a direct mapped state, wherein the direct mapped state indicates that each data block pointer of the set of data block pointers of the indirect block pointer is arithmetically computed by using the pre-defined function.

8. The method of claim 7, wherein the storage server is represented by a file server, wherein the file server presents a logical view of a file to a client of the file server.

9. The method of claim 7, wherein each data block pointer of a set of data block pointers stored in an indirect block pointer includes a data block mapping flag indicating whether the data block pointer is in the direct mapped state, wherein the direct mapped state indicates that a data block pointed to by the data block pointer is accessed by arithmetically computing an address of the data block by using the pre-defined function.

10. The method of claim 9, wherein creating the file in the direct mapped mode further comprising:
   updating the inode mapping flag of the inode of the file indicating that the file is in the direct mapped mode;
   updating the indirect block mapping flag of each indirect block pointer of the set of indirect block pointers of the inode indicating that each indirect block pointer is in the direct mapped state; and
   updating the data block mapping flag of each data block pointer of a set of data block pointers stored in each indirect block pointer of the set of indirect block pointers of the inode indicating that each data block pointer is in the direct mapped state.

11. The method of claim 9, wherein performing the I/O request on the file in the partial mapped mode further comprises the steps of:
   determining a data block pointer of the file, wherein the data block pointer is associated with a file offset, wherein the I/O request specifies the file offset for performing an I/O operation at the file offset;
   evaluating a data block mapping flag of the data block pointer; and
   based on the evaluation of the data block mapping flag, determining a file system block number for accessing data stored at the file offset, wherein the file system block number is arithmetically computed by using the pre-defined function if the data block mapping flag indicates that the data block pointer is in the direct mapped state.

12. The method of claim 10, wherein converting the file from the direct mapped mode to the partial mapped mode further comprises the steps of:
   updating the inode mapping flag of the inode of the file to indicate that the file is in the partial mapped mode;
   updating a data block mapping flag of each data block pointer of the set of data block pointers of the new indirect block to indicate that each data block pointer is in the direct mapped state;
   updating a data block mapping flag of a data block pointer of the new indirect block pointing to the new data block to indicate that the data block pointer is in an indirect mapping state; and
   updating an indirect block mapping flag of the new indirect block to indicate that the new indirect block is in a partial mapped state.

13. The method of claim 7, wherein the unwinding operation further comprises the steps of:
   a) evaluating a data block mapping flag associated with each data block pointer of a set of data block pointers stored in an indirect block pointer;
   b) determining, based on whether the data block mapping flag of each data block pointer of the set of data block pointers indicates that each data block pointer is in a direct mapped state, whether to update an indirect block mapping flag associated with the indirect block pointer and delete an indirect block pointed to by the indirect block pointer to indicate that the indirect block pointer is in the direct mapped state; and
   repeating steps a-b until each indirect block pointer of a set of indirect block pointers stored in the inode of the file is evaluated.

14. A computer program product for operating on a storage server in a data network for read or write access to data of a file, wherein the file includes a set of data block that contain data of the file and an inode containing metadata of the file, wherein the program product includes computer-executable logic which is in communication with the storage server and the secondary storage, and which is encoded on a non-transitory computer-readable medium, for executing the following steps:
   creating the file in a direct mapped mode, wherein the direct mapped mode indicates that an address of each data block of the set of data blocks of the file is arithmetically computed by using a pre-defined function, wherein each data block of the set of data blocks is allocated on the storage server at the time the file is created;
   responsive to a write request directed to the file in the direct mapped mode by a client of the storage server to write to a new data block, converting the file from the direct mapped mode to a partial mapped mode by allocating a new indirect block, wherein the new indirect block includes a set of data block pointers, wherein an address of the new data block is stored in a data block pointer of the set of data block pointers of the new indirect block; and
   performing an I/O request on the file in the partial mapped mode, wherein the I/O request includes reading to the file and writing to the file, wherein the partial mapped mode indicates that a first portion of the file is in an indirect mapped mode and a second portion of the file is in the direct mapped mode, wherein data of the first portion of the file in the indirect mapped mode is accessed by performing an address lookup operation;
   wherein the inode of the file includes an inode mapping flag, wherein the inode mapping flag indicates whether the file is in the direct mapped mode, wherein the inode mapping flag of the file in the direct mapped mode indicates that an address of each data block of the set of data blocks of the file is arithmetically computed by using the pre-defined function;
   wherein the inode of the file includes a set of indirect block pointers, wherein each indirect block pointer of the set of indirect block pointers includes an indirect block mapping flag and a set of data block pointers, wherein the indirect block mapping flag of each indirect block pointer of the set of indirect block pointers indicates whether the indirect block pointer is in a direct mapped state, wherein the direct mapped state indicates that each data block pointer of the set of data block pointers of the indirect block pointer is arithmetically computed by using the pre-defined function.

* * * * *